(12) United States Patent
Bjørdal et al.

(10) Patent No.: US 11,340,879 B2
(45) Date of Patent: May 24, 2022

(54) TECHNIQUES FOR DYNAMICALLY PROVISIONING ELECTRONIC SUBSCRIBER IDENTITY MODULES TO MOBILE DEVICES

(71) Applicant: Apple Inc., Cupertino, CA (US)

(72) Inventors: Ståle H. Bjørdal, Cedar Park, TX (US);
Benjamin J. Livesay, Dallas, TX (US);
Neal M. Flanagan, Haslet, TX (US)

(73) Assignee: Apple Inc.

( * ) Notice: Subject to any disclaimer, the term of this patent is extended or adjusted under 35 U.S.C. 154(b) by 220 days.

(21) Appl. No.: 16/124,162

(22) Filed: Sep. 6, 2018

(65) Prior Publication Data
US 2020/0050439 A1 Feb. 13, 2020

Related U.S. Application Data

(60) Provisional application No. 62/716,321, filed on Aug. 8, 2018.

(51) Int. Cl.
*G06F 8/61* (2018.01)
*H04W 8/18* (2009.01)

(52) U.S. Cl.
CPC .............. *G06F 8/61* (2013.01); *H04W 8/183* (2013.01)

(58) Field of Classification Search
None
See application file for complete search history.

(56) References Cited

U.S. PATENT DOCUMENTS

| | | | |
|---|---|---|---|
| 9,369,938 B2 | 6/2016 | Biggs et al. | |
| 9,432,067 B2 | 8/2016 | Li et al. | |
| 9,661,494 B2 | 5/2017 | Suzuki et al. | |
| 10,021,558 B2 | 7/2018 | Lalwaney | |
| 2004/0176134 A1* | 9/2004 | Goldthwaite | G06Q 20/322 455/558 |
| 2012/0108295 A1* | 5/2012 | Schell | H04W 4/50 455/558 |

(Continued)

FOREIGN PATENT DOCUMENTS

| | | |
|---|---|---|
| EP | 3313111 A1 | 4/2018 |
| WO | 2014047494 A1 | 3/2014 |
| WO | 2017172604 A1 | 10/2017 |

OTHER PUBLICATIONS

International application No. PCT/US2019/040097—International Search Report and Written Opinion dated Oct. 24, 2019.

(Continued)

*Primary Examiner* — Qing Chen
(74) *Attorney, Agent, or Firm* — Dickinson Wright RLLP

(57) ABSTRACT

Representative embodiments enable a software application to access wireless services provided by a mobile network operator (MNO). According to some embodiments, a method can be implemented at a mobile device, and include (1) receiving, from a software application management entity, an installation package that includes: (i) first information for installing a software application, and (ii) second information for an electronic Subscriber Identity Module (eSIM) to be utilized by the software application to access the wireless services provided by the MNO, (2) utilizing the first information to install the software application on the mobile device, and (3) in response to receiving a request to launch the software application, causing the software application to execute on the mobile device, where: (i) the software application utilizes the eSIM to access wireless services provided by the MNO, and (ii) the wireless services are restricted in accordance with parameters associated with the eSIM.

20 Claims, 9 Drawing Sheets

(56) References Cited

U.S. PATENT DOCUMENTS

| | | | |
|---|---|---|---|
| 2013/0023309 A1 | 1/2013 | Holtmanns et al. | |
| 2013/0231087 A1 | 9/2013 | Oleary | |
| 2013/0303122 A1* | 11/2013 | Li | H04W 12/0023 |
| | | | 455/411 |
| 2015/0350878 A1* | 12/2015 | Li | H04W 8/20 |
| | | | 455/558 |
| 2015/0350879 A1 | 12/2015 | Li et al. | |
| 2016/0302070 A1* | 10/2016 | Yang | H04W 4/50 |
| 2016/0316356 A1 | 10/2016 | Li et al. | |
| 2016/0352377 A1 | 12/2016 | Li et al. | |
| 2017/0094628 A1* | 3/2017 | Miao | H04W 60/005 |
| 2017/0127264 A1* | 5/2017 | Yang | H04L 63/0428 |
| 2017/0149827 A1 | 5/2017 | Sims et al. | |
| 2017/0289788 A1* | 10/2017 | Lalwaney | H04W 8/24 |
| 2018/0027603 A1* | 1/2018 | Lee | H04W 8/005 |
| | | | 370/329 |
| 2018/0063668 A1* | 3/2018 | Li | H04W 4/50 |
| 2018/0160294 A1* | 6/2018 | Lee | H04W 12/35 |
| 2018/0213078 A1* | 7/2018 | Visuri | H04W 8/205 |
| 2018/0234837 A1* | 8/2018 | Lee | H04W 8/205 |
| 2018/0302781 A1* | 10/2018 | Lee | H04L 63/20 |
| 2019/0349743 A1* | 11/2019 | Hamblet | H04W 4/24 |
| 2020/0007655 A1* | 1/2020 | Namiranian | H04W 8/00 |
| 2020/0037153 A1* | 1/2020 | Anand | H04W 12/00514 |

OTHER PUBLICATIONS

European Patent application 19847188.0—Extended European Search Report dated Apr. 5, 2022.

* cited by examiner

TECHNIQUES FOR DYNAMICALLY PROVISIONING ELECTRONIC SUBSCRIBER IDENTITY MODULES TO MOBILE DEVICES

CROSS-REFERENCE TO RELATED APPLICATIONS

The present application claims the benefit of U.S. Provisional Application No. 62/716,321, entitled "TECHNIQUES FOR DYNAMICALLY PROVISIONING ELECTRONIC SUBSCRIBER IDENTITY MODULES TO MOBILE DEVICES," filed Aug. 8, 2018, the content of which is incorporated herein by reference in its entirety for all purposes.

FIELD

The described embodiments set forth techniques for dynamically provisioning electronic Subscriber Identity Modules (eSIMs) to mobile devices. In particular, the embodiments set forth techniques that associate software applications on the mobile devices with respective eSIMs, thereby enabling each software application to access wireless services in a manner that individually suits the connectivity needs of the software application.

BACKGROUND

Mobile devices—e.g., smart phones, tablets, etc.—are configured to utilize Universal Integrated Circuit Cards (UICCs) that enable the mobile devices to access wireless services provided by Mobile Network Operators (MNOs). In particular, each UICC includes at least a microprocessor and a read-only memory (ROM), where the ROM is configured to store an MNO profile—also referred to herein as a Subscriber Identity Module (SIM)—that a mobile device can utilize to register and interact with an MNO associated with the MNO profile. Typically, a UICC takes the form of a small removable card—commonly referred to as a "SIM card"—that is configured to be inserted into a UICC-receiving bay included in a mobile device. In more recent implementations, however, UICCs are being embedded directly into system boards of mobile devices. These electronic/embedded UICCs (eUICCs) can provide advantages over traditional SIM cards, e.g., an eUICC can store a number of MNO profiles—referred to herein as electronic Subscriber Identity Modules (eSIMs)—and can eliminate the need to include UICC-receiving bays in mobile devices.

Importantly, despite the fact that eSIMs/eUICCs improve overall flexibility with respect to how the mobile devices can interact with different MNOs, the mobile devices typically are configured to interface with only single MNO through which all data is communicated. For example, a majority of use-cases involve each user subscribing to a single plan offered by an MNO, where all software applications installed on the user's mobile device utilize the same wireless service (using the same eSIM) provided by the MNO. Notably, in most cases, the wireless service is expensive and underutilized by the user. This is unfortunate given that a considerable number of scenarios exist where it would be desirable to enable certain software applications to access MNO services at a finer level of granularity, which presently is not possible through the implementation of conventional SIM-based approaches.

SUMMARY

Representative embodiments described herein set forth techniques for enabling a collection of electronic Subscriber Identity Modules (eSIMs) to be installed on a mobile device, where the collection of eSIMs enables the mobile device to simultaneously access different services provided by different Mobile Network Operators (MNOs). According to some embodiments, software applications can be installed on the mobile device by way of a software application management entity (e.g., a mobile device management (MDM) entity, a software application store ("app store"), etc.). Moreover, each software application can be individually associated with a different/respective eSIM within the collection of eSIMs. In this manner, the eSIM associated with a given software application enables the software application to access wireless services that are restricted in accordance with the eSIM (e.g., bandwidth levels, data allotment levels, priority levels, security requirements, etc.). Accordingly, the mobile device is beneficially able to access MNO services at a finer level of granularity based on its needs (e.g., data connectivity requirements for one or more software applications installed on the mobile device), thereby mitigating scenarios where the mobile device is forced to utilize a single wireless service that is excessive or insufficient.

One embodiment sets forth a method for a mobile device to enable a software application on the mobile device to access wireless services provided by a mobile network operator (MNO). According to some embodiments, the method can be implemented at the mobile device, and include the steps of (1) receiving, from a software application management entity—e.g., a mobile device management (MDM) entity, a software application store ("app store"), etc.—an installation package that includes: (i) first information for installing the software application, and (ii) second information for an electronic Subscriber Identity Module (eSIM) to be utilized by the software application to access the wireless services provided by the MNO, (2) utilizing the first information to install the software application on the mobile device, and (3) in response to receiving a request to launch the software application, causing the software application to execute on the mobile device, where: (i) the software application utilizes the eSIM to access wireless services provided by the MNO, and (ii) the wireless services are restricted in accordance with parameters associated with the eSIM.

Another embodiment sets forth a method for a software application management entity—e.g., a mobile device management (MDM) entity, an app store, etc.—to enable a software application on a mobile device to access wireless services provided by a mobile network operator (MNO). According to some embodiments, the method can be implemented by a server device managed by the software application management entity, and include the steps of (1) receiving, from the mobile device, a request to install a software application on the mobile device, (2) identifying an electronic Subscriber Identity Module (eSIM) to be utilized by the software application to access wireless services provided by a mobile network operator (MNO), (3) generating an installation package that includes: (i) first information for installing the software application, and (ii) second information associated with the eSIM, and (4) providing the installation package to the mobile device to cause the mobile device to: (i) install the software application, and (ii) install the eSIM, where the software application utilizes the eSIM to access the wireless services provided by the MNO, and the wireless services are restricted in accordance with parameters associated with the eSIM.

Additional embodiments include a non-transitory computer readable storage medium configured to store instructions that, when executed by a processor included in a computing device, cause the computing device to carry out any of the above-described methods. Additional embodiments include a computing device that includes a processor configured to cause the computing device to carry out any of the above-described methods.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments described herein set forth techniques for enabling a collection of eSIMs to be installed on a mobile device, where the collection of eSIMs enables the mobile device to simultaneously access different services provided by different MNOs. In particular, and according to some embodiments, software applications installed on the mobile device—e.g., by way of a software application management entity—can be associated with a different/respective eSIM within the collection of eSIMs. In this manner, each software application utilizes its respective eSIM to access wireless services that are provided by an MNO. According to some embodiments, the software application management entity can provision, to the mobile device, (1) a software application, and (2) information associated with an eSIM to be utilized by the software application to access wireless services. In response, the mobile device can install the software application, and download the eSIM from an eSIM distribution entity. According to some embodiments, an electronic Universal Integrated Circuit Card (eUICC) included in the mobile device can be configured to manage the collection of eSIMs on the mobile device. Moreover, the eUICC can be configured to interface with a baseband component that enables the mobile device to simultaneously communicate—e.g., in a parallel mode, a multiplexed mode, etc.—with different MNOs associated with the eSIMs. In this manner, when a given software application executes on the mobile device, the mobile device can utilize the corresponding eSIM (assigned to the software application) to access wireless services that are utilized by the software application.

A more detailed discussion of the foregoing techniques is set forth below and described in conjunction with FIGS. 1-6, which illustrate detailed diagrams of systems and methods that can be used to implement these techniques.

Figure 1:
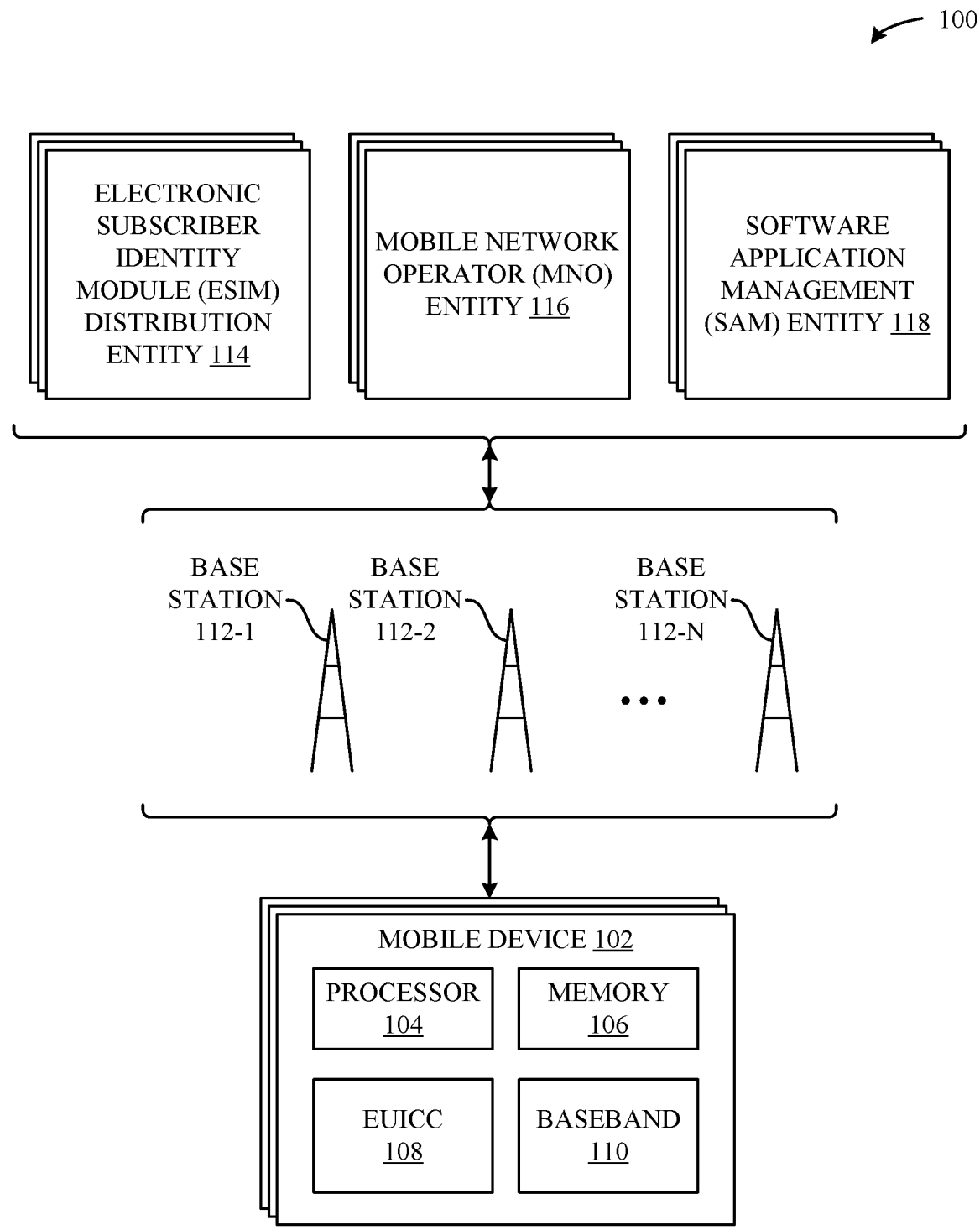
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes mobile devices 102 and a group of base stations 112 associated with one or more mobile network operator (MNO) entities 116. According the illustration of FIG. 1, each mobile device 102 can represent a mobile computing device (e.g., a cellular phone or a smart phone, a tablet computer, a laptop computer, a notebook computer, a personal computer, a netbook computer, a media player device, an electronic book device, a MiFi® device, a wearable computing device, etc.). According to some embodiments, the base stations 112 can represent different radio towers that enable the mobile devices 102 and the MNO entities 116 to communicate with one another, where the MNO entities 116 represent different wireless service providers that provide wireless services (e.g., voice, short message service (SMS), data, etc.) that the mobile devices 102 can access. As also shown in FIG. 1, the system 100 can include electronic Subscriber Identity Module (eSIM) distribution entities 114 that can implement services for obtaining/generating eSIMs for delivery to the mobile devices 102. Moreover, the system 100 can include software application management entities 118 that can implement services that enable the mobile devices 102 to install software applications and access eSIMs associated with the software applications.

As a brief aside, it is noted that it is not a requirement for the mobile devices 102 to communicate with the MNO entities 116, eSIM distribution entities 114, and software application management entities 118 through the base stations 112. On the contrary, any means for communicating—e.g., a wireless connection (e.g., a WiFi connection, etc.), a wired connection (e.g., an Ethernet connection, a tethered connection, etc.), etc.—over any network—e.g., a local area network, a wide area network, etc.—can be utilized without departing from the scope of this disclosure.

As shown in FIG. 1, each mobile device 102 can include a processor 104, a memory 106, an embedded/electronic Universal Integrated Circuit Card (eUICC) 108, and a baseband 110. According to some embodiments, these components can work in conjunction to enable the mobile devices 102 to provide useful features to users, e.g., localized computing, location-based services, voice communications, Internet connectivity, and so on. As described in greater detail herein, the eUICC 108 can be configured to manage various eSIMs for accessing wireless services provided by the different MNO entities 116 through the base stations 112. For example, the eUICC 108 of a mobile device 102 can be configured to store a respective eSIM for one or more software applications installed on the mobile device 102, where each eSIM is tied to a wireless service offered by a respective MNO entity 116. It is noted that the eUICC 108 can also store one or more eSIMs that permit the mobile device 102 to access wireless services in a general sense, e.g., to perform data transmissions for software applications on the mobile device 102 that are not tied to a specific eSIM.

It is noted that the embodiments described herein are not limited only to utilizing embedded/electronic Universal Integrated Circuit Cards (e.g., the eUICC 108). On the contrary, the mobile devices 102 can also be configured to include one or more receiving bays for physical/removable SIM cards, such that the SIM cards can be used in place of/in addition to the eSIMs managed by the eUICC 108. For example, any number of physical/removable SIM cards that conform to any form factor standard (e.g., 2FF, 3FF, 4FF, etc.) can be utilized when implementing the embodiments described herein without departing from the scope of this disclosure.

Accordingly, FIG. 1 provides an overview of various entities that can operate in concert to implement the techniques set forth herein. A more detailed description of these entities, as well as the manner in which they communicate with one another, will now be provided below in conjunction with FIGS. 2A-2D.

Figure 2A:
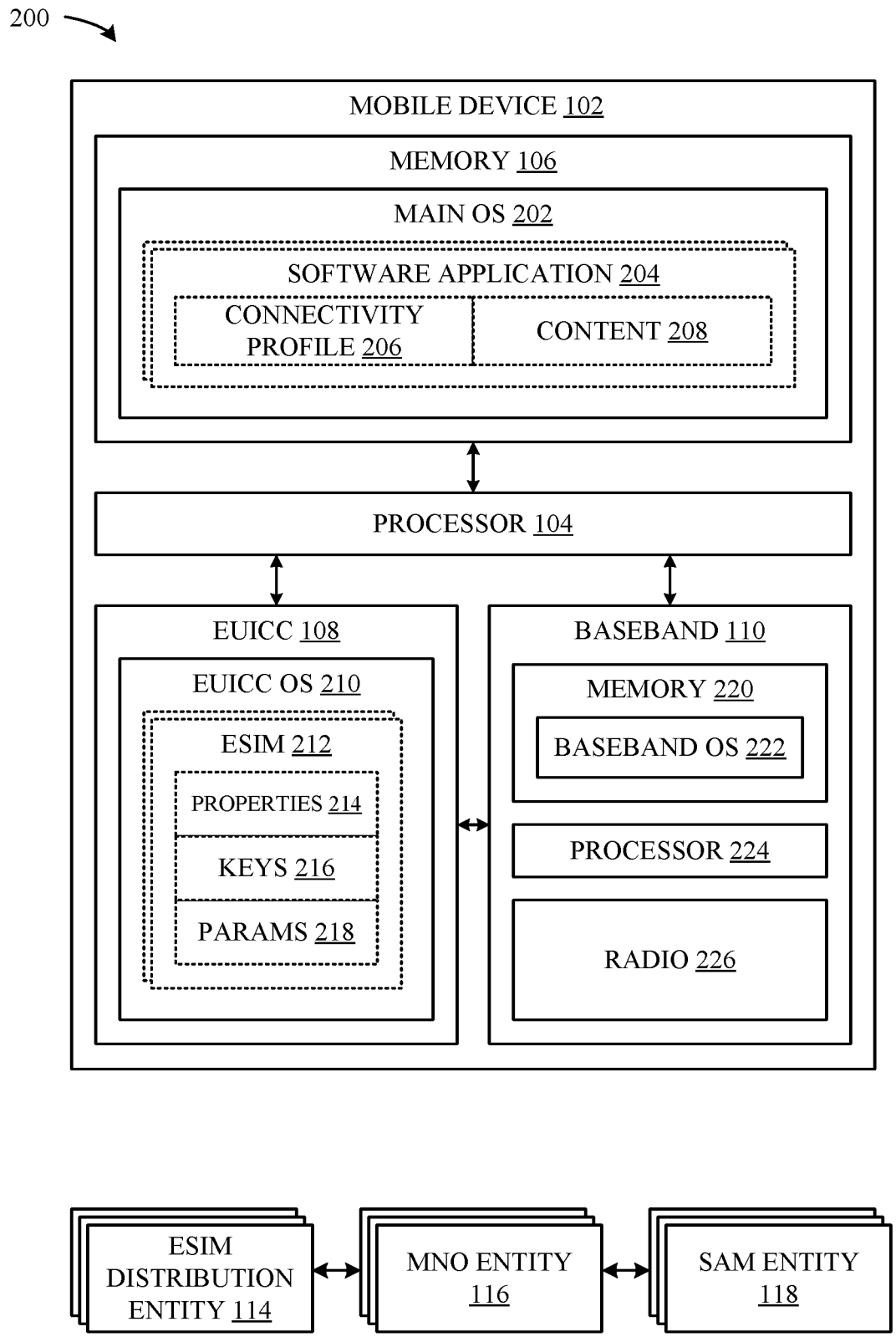
FIG. 2A illustrates a block diagram that provides a more detailed view of a mobile device illustrated in FIG. 1, according to some embodiments.

FIG. 2A illustrates a block diagram 200 that provides a more detailed view of the mobile device 102 of FIG. 1, according to some embodiments. According to some embodiments, and as shown in FIG. 2A, the processor 104 of the mobile device 102—in conjunction with the memory 106 of the mobile device 102—can implement a main operating system (OS) 202 that is configured to execute software applications 204 (e.g., native OS applications, user applications, etc.). As shown in FIG. 2A, each software application 204 can include a connectivity profile 206 and content 208. According to some embodiments, the content 208 can represent various files that enable software application 204 to execute on the mobile device 102, e.g., executable files, configuration files, and so on. According to some embodiments, the connectivity profile 206 can include information that identifies a specific eSIM 212 to be utilized when performing data transmissions associated with the operation of the software application 204. For example, the connectivity profile 206 can include a unique identifier associated with an eSIM 212 managed by the eUICC 108. In this manner, when a software application 204 launches on the mobile device 102—and issues a request to perform a data transmission—the mobile device 102 can identify, based on the connectivity profile 206 associated with the software application 204, the eSIM 212 that corresponds to the software application 204. In turn, the mobile device 102 can utilize the eSIM 212 to carry out the data transmission, which is described below in greater detail.

As a brief aside, it is noted that, in the interest of simplifying this disclosure, the software applications 204 are described herein as having a one-to-one relationship with a respective eSIM 212. However, each software application 204 can have a one-to-many relationship with multiple eSIMs 212 without departing from the scope of this disclosure. In particular, a given software application 204 can be associated with two or more eSIMs 212—e.g., by way of eSIM 212 identifiers included in the connectivity profile 206 of the software application 204—which can provide many benefits, including improved operational efficiency and redundancy, cost savings, and so on.

According to some embodiments, the connectivity profile 206 can store any information to enable the mobile device 102 to select an eSIM 212 that is relevant to the current operational context of the mobile device 102 and/or software application 204. In one example, the connectivity profile 206 can indicate a priority level for each eSIM 212 associated with the software application 204, which causes the mobile device 102 to attempt to conduct data transmissions using the eSIMs 212 associated with the software application 204 in accordance with their priority levels. For example, if an eSIM 212 having a highest priority level is associated with an MNO entity 116 that currently cannot be reached (e.g., during a roaming condition), the mobile device 102 can attempt to establish connections with the MNO entities 116 associated with the eSIMs 212 having successively lower priority levels. In another example, the connectivity profile 206 can indicate geographical preferences for each eSIM 212 associated with the software application 204, which causes the mobile device 102 to conduct data transmissions in accordance with the eSIM 212 that is most effective based on a current location of the mobile device 102. In yet another example, the connectivity profile 206 can indicate temporal preferences for each eSIM 212 associated with the software application 204, which causes the mobile device 102 to conduct data transmissions in accordance with the eSIM 212 that is most effective based on a current date/time. In yet another example, the connectivity profile 206 can indicate data cap limitations—e.g., data usage caps—for each eSIM 212 associated with the software application 204, which causes the mobile device 102 to conduct data transmissions in accordance with the eSIM 212 that is most-eligible under the data cap limitations. In yet another example, the connectivity profile 206 can indicate data transmission preferences—e.g., data types (e.g., text, images, videos), transfer types (e.g., download, upload, etc.), connection types (e.g., hypertext transfer protocol (HTTP), file transfer protocol (FTP), secure, unsecure, etc.), etc.—for each eSIM 212 associated with the software application 204, which causes the mobile device 102 to conduct data transmissions in accordance with the eSIM 212 that is most effective with respect to the context of the data transmissions.

It is noted that the foregoing examples do not represent an exhaustive list of information that can be included in the connectivity profile 206 to affect the eSIMs 212 that are utilized by the mobile device 102 when conducting data transmissions for the software application 204. On the contrary, the connectivity profile 206 can be configured to include any information that enables the operational efficiency of the mobile device 102 to be improved through the selection of the eSIM 212 that is most relevant to the software application 204 throughout its execution. It is additionally noted that all or a subset of the information included in the connectivity profile 206 can instead be included in the eSIM 212 without departing from the scope of this disclosure.

Returning now to FIG. 2A, the eUICC 108 can implement an eUICC OS 210 that is configured to manage the hardware resources of the eUICC 108 (e.g., a processor and a memory (not illustrated in FIG. 2A)). According to some embodiments, the eUICC 108 can be configured to manage eSIMs 212 that can be obtained via the techniques described herein—e.g., directly from the software application management entity 118, the eSIM distribution entity 114, the MNO entity 116, from other entities not illustrated in the FIGS., and so on. According to some embodiments, the eUICC OS 210 can be configured to activate the eSIMs 212 within the eUICC 108 and provide the baseband 110 with access to relevant aspects of the eSIMs 212 to enable the mobile device 102 to interface with the MNO entities 116. For example, the eUICC OS 210 can receive a request from the software application 204 to perform a data transmission, where the request includes an identifier associated with an eSIM 212 that the software application 204 desires to utilize when performing the data transmission. In turn, the eUICC OS 210 can carry out the foregoing techniques to enable the data transmission to be carried out with the MNO entity 116 that corresponds to the eSIM 212, which is described below in greater detail.

According to some embodiments, and as shown in FIG. 2A, each eSIM 212 can include properties 214 used by the mobile device 102 to establish a connection with the MNO entity 116 to which the eSIM 212 corresponds (e.g., Access Point Names (APNs) for Global System for Mobile Communication (GSM) networks, Packet Data Protocols (PDPs), etc.), user interface (UI)-related information to display at the mobile device 102 (e.g., a carrier name associated with the MNO entity 116), and the like. Additionally, each eSIM 212 can be associated with a unique identifier (ID) and can include multiple applets that define the manner in which the eSIM 212 operates. For example, one or more of the applets, when implemented by the baseband 110 and the eUICC 108, can enable the mobile device 102 to access wireless services provided by the MNO entity 116. Additionally, each eSIM 212 can include encryption keys 216 that enable the mobile device 102 to authenticate with the MNO entity 116 (e.g., using well-known techniques). Additionally, each eSIM 212 can include parameters 218 that identify various aspects of the wireless services that are to be provided by the MNO entity 116 in conjunction with the utilization of the eSIM 212 by its corresponding software application 204, which are described below in greater detail.

According to some embodiments, the parameters 218 of a given eSIM 212 can indicate a priority level associated with the wireless services that are to be provided by the MNO entity 116 associated with the eSIM 212. For example, the priority level can indicate a minimum quality of service (QOS) that requires to the MNO entity 116 to guarantee response rates, uptimes, and so on, when providing the wireless services. The parameters 218 can also indicate a bandwidth level that is to be provided. For example, the bandwidth level can indicate that the MNO entity 116 is required to guarantee minimum download/upload speeds when the mobile device 102 is communicating with the MNO entity 116 (e.g., via the base stations 112). The parameters 218 can further indicate a data allotment that is to be provided. For example, the data allotment can indicate total amounts of data that can be uploaded/downloaded by the mobile device 102 within any time span (e.g., seconds, minutes, hours, days, weeks, months, etc.). The parameters 218 can further indicate security requirements that are to be provided. For example, the security requirements can indicate different encryption requirements to be enforced on all data transmissions by the mobile device 102, on certain types of data transmissions by the mobile device 102, and so on. The parameters 218 can further indicate roaming privileges that are to be provided. For example, the roaming privileges can indicate that the mobile device 102 is permitted to access wireless services provided by one or more partner MNO entities 116 when the mobile device 102 is not within range of the MNO entity 116 to which the eSIM 212 corresponds. Additionally, the parameters 218 can indicate temporal aspects that are to be enforced. For example, the temporal aspects can indicate periods in which the mobile device 102 is permitted to perform the data transmissions. It is noted that the above-described parameters 218 are exemplary and not meant to be limiting in any way. On the contrary, the parameters 218 encompass any known properties that can be used to modify the manner in which data transmissions are to be carried out between the mobile device 102 and the MNO entity 116.

Returning now to FIG. 2A, the baseband 110 of the mobile device 102 can include a baseband OS 222 that is configured to manage the hardware resources of the baseband 110 (e.g., a memory 220, a processor 224, a radio 226, etc.). According to some embodiments, the baseband 110/baseband OS 222 can implement a manager (not illustrated in FIG. 2A) that is configured to interface with the eUICC 108. The manager also can be configured to implement various services, e.g., a collection of software modules that are instantiated by way of the various applets of activated eSIMs 212 that are managed by the eUICC 108. For example, the services can be configured to simultaneously manage the different connections that exist between the mobile device 102 and the MNO entities 116 according to the different eSIMs 212 that are activated within the mobile device 102.

Additionally, it is noted that the eSIM distribution entity 114 can be configured to manage eSIMs 212 for distribution to the mobile devices 102. According to some embodiments, the eSIM distribution entity 114 can be configured to interface with other servers that manage digital repositories (not illustrated in FIG. 2A) in which eSIMs 212 are managed/included. For example, the eSIM distribution entity 114 can be configured to issue requests to the digital repositories for eSIMs 212, and then provide the eSIMs 212 to the mobile devices 102. Alternatively, the eSIM distribution entity 114 can be configured to issue requests to the digital repositories for eSIMs 212, and then provide information to the mobile devices 102 that indicates how to access the eSIMs 212 directly from the digital repositories, which can help increase efficiency through load balancing.

Additionally, the software application management entity 118 can be configured to enable the mobile device 102 to (1) install software applications 204, and (2) install respective eSIMs 212 associated with the software applications 204. According to some embodiments, and as previously described herein, the software application management entity 118 can represent a software application store ("app store") with which the mobile device 102 can interface to browse, download, and install software applications 204/eSIMs 212. In this regard, developers of a given software application 204 can provide information about wireless services that should be made available to the software application 204 (by way of one or more eSIMs 212) to ensure that the software application 204 operates as intended. With this approach, it can be necessary for billing information to be established in conjunction with installing the software application 204/eSIM(s) 212, especially in scenarios where ongoing data connectivity provided by the eSIM(s) 212 is expected. For example, when a user seeks to install a software application 204, the user can be presented with a list of wireless services that are recommended for the software application 204 (as described above). In response, the user can select one or more wireless services (e.g., multiple services when redundancy is desirable), and provide the appropriate billing information. In turn, the appropriate eSIM(s) 212 can be selected and registered to the user, which can be accomplished by providing the relevant information to the MNO entity 116 associated with the eSIM 212. Finally, the eSIM(s) 212 can be provided to the mobile device 102 for installation, as described herein. It is noted that information associated with one or more of the software applications 204 and the eSIMs 212 can be provided in lieu of the software applications 204 and the eSIMs 212 (in their completed form), where, in turn, the mobile devices 102 can obtain the software applications 204 and eSIMs 212 from other entities (e.g., distribution entities).

It is noted that the foregoing techniques are exemplary and should not be construed as limiting in any way. On the contrary, the software application management entity 118 can represent any entity capable of facilitating the installation of software applications 204 and eSIMs 212 on the mobile devices 102. For example, the software application management entity 118 can represent a mobile device management (MDM) entity that is authorized to oversee the operation of a collection of mobile devices 102. In this example, the MDM entity can be capable of delivering software applications 204/eSIMs 212 directly to the mobile devices 102 to reduce the amount of interaction that otherwise would be required from the end-users of the mobile devices 102 (e.g., employees of a company). In another example, the MDM entity can be capable of delivering information associated with software applications 204/eSIMs 212 directly to the mobile devices 102, where the information enables the mobile devices 102 to interface with other entities—e.g., the eSIM distribution entity 114, the MNO entity 116, a software application store, etc.—to download and install the software applications 204/eSIMs 212.

It is noted that the above-described architectures/relationships between the mobile devices 102, the eSIM distribution entities 114, the MNO entities 116, and the software application management entities 118 are exemplary and do not represent an exhaustive breakdown of potential interactions. On the contrary, the different functionalities performed by these entities can be combined into fewer entities or separated into additional entities without departing from the scope of this disclosure.

Accordingly, FIG. 2A sets forth a more detailed view of the mobile device 102, and the manner in which the various components of the mobile device 102 can interoperate to implement different aspects of the techniques set forth herein. Accordingly, FIGS. 2B-2D will now be described below, which set forth high-level interactions that can take place between the mobile device 102, the MNO entity 116, the eSIM distribution entity 114, and the software application management entity 118, to enable the software application management entity 118 to provision a software application 204 and a corresponding eSIM 212 to the mobile device 102, according to some embodiments.

Figure 2B:
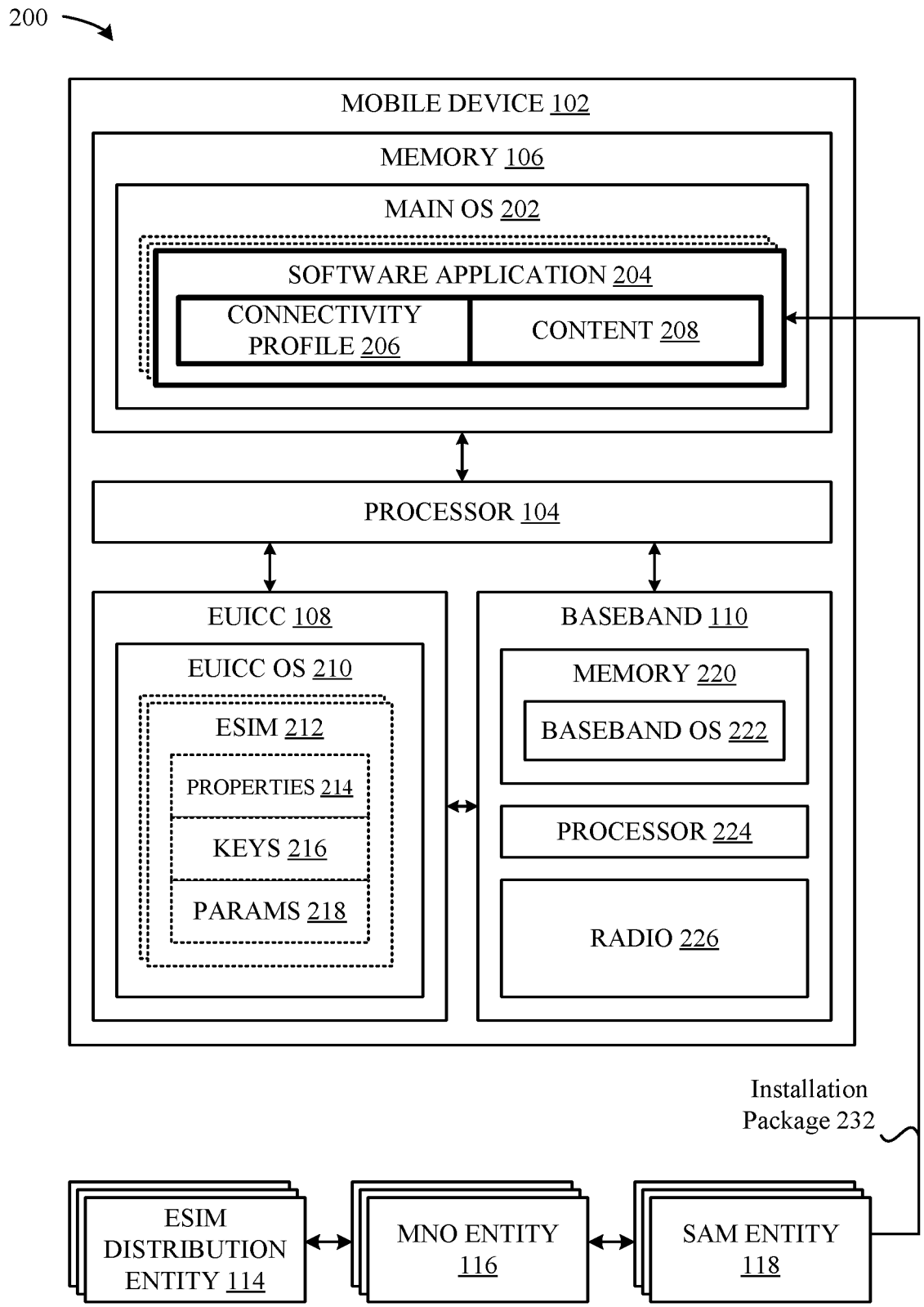
FIGS. 2B-2D illustrate sequence diagrams of high-level events that involve a software application management entity provisioning a software application and a corresponding electronic Subscriber Identity Module (eSIM) to a mobile device, according to some embodiments.

As shown in FIG. 2B, a step 232 can involve the software application management entity 118 distributing an installation package to the mobile device 102. According to some embodiments, the installation package can include (1) the software application 204, and (2) information associated with the corresponding eSIM 212. A more detailed breakdown of the manner in which the software application management entity 118 distributes the installation package to the mobile device 102 is provided below in conjunction with FIG. 3.

Figure 2C:
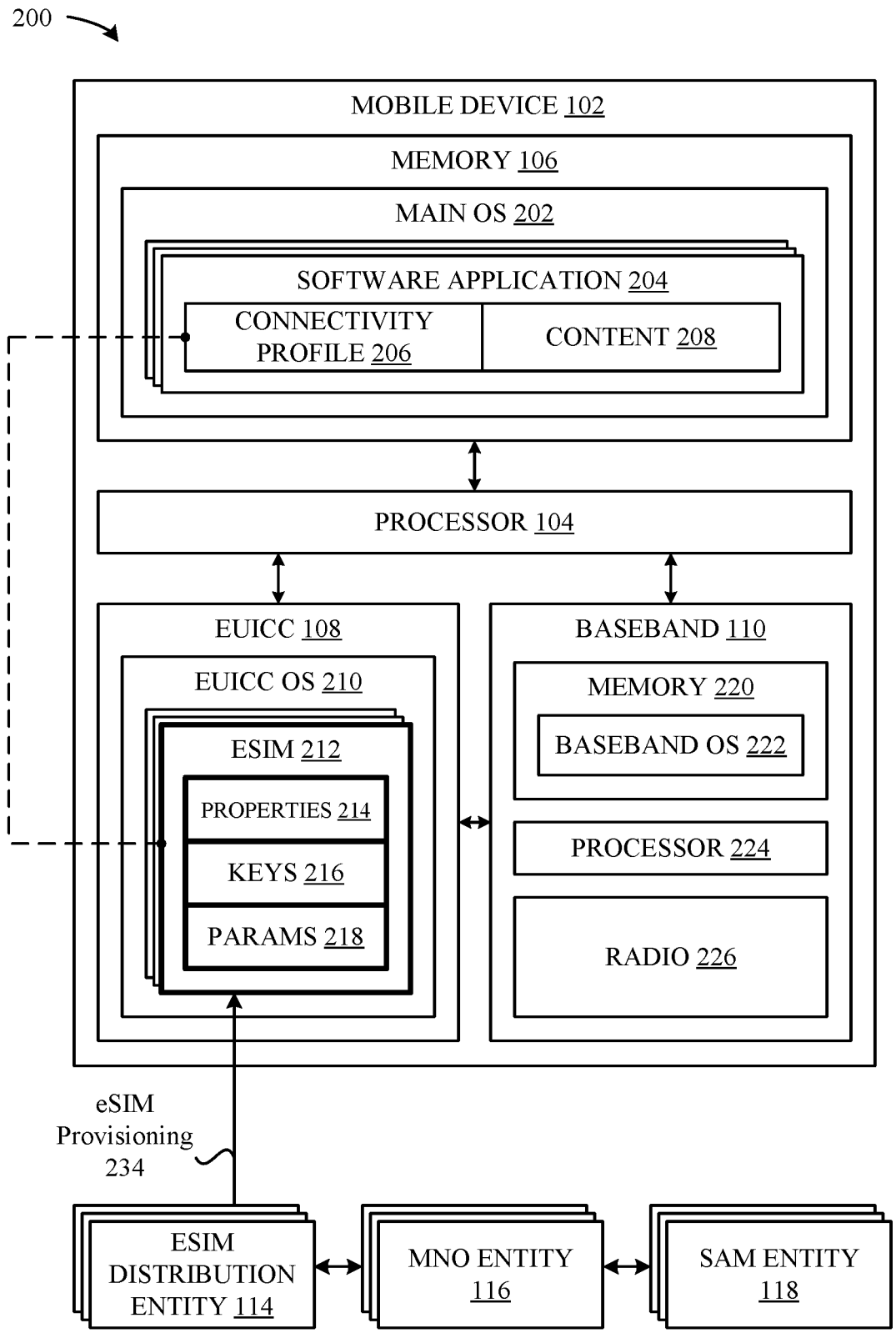

Turning now to FIG. 2C, a step 234 can involve the eSIM distribution entity 114 provisioning the eSIM 212 to the mobile device 102. As illustrated in FIG. 2C, the connectivity profile 206 associated with the software application 204 (included in the installation package) corresponds to the eSIM 212 that is provisioned to the mobile device 102. A more detailed breakdown of the manner in which the eSIM distribution entity 114 provisions the eSIM 212 to the mobile device 102 is also provided below in conjunction with FIG. 3.

Figure 2D:
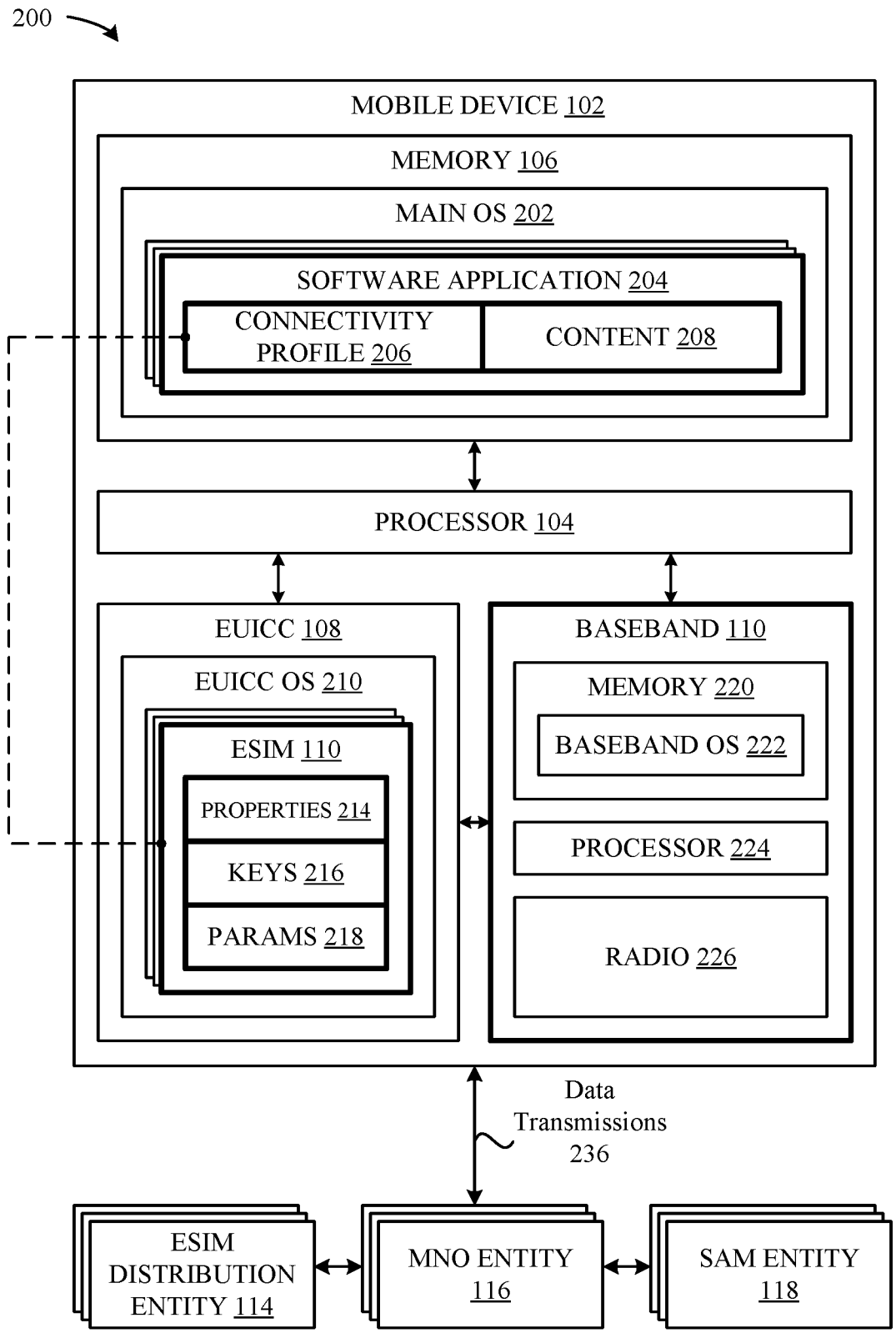

Additionally, turning now to FIG. 2D, a step 236 can involve the mobile device 102 conducting data transmissions with an MNO entity 116 that corresponds to the eSIM 212. According to some embodiments, and as previously described herein, the data transmissions can be restricted to coincide with the properties 214 assigned to the eSIM 212 (e.g., the priority level, the bandwidth level, the data allotment, the security requirements, etc.). A more detailed breakdown of the manner in which the mobile device 102 and the MNO entity 116 perform data transmissions in accordance with the eSIM 212 is further provided below in conjunction with FIG. 3.

Accordingly, FIG. 2A sets forth a more detailed view of the mobile device 102, while FIGS. 2B-2D set forth high-level interactions that can take place between the mobile device 102, the MNO entity 116, the eSIM distribution entity 114, and the software application management entity 118, when provisioning a software application 204 and corresponding eSIM 212, according to some embodiments. A more detailed breakdown of the manner in which the various techniques set forth herein can be implemented will now be provided below in conjunction with FIGS. 3-5.

Figure 3:
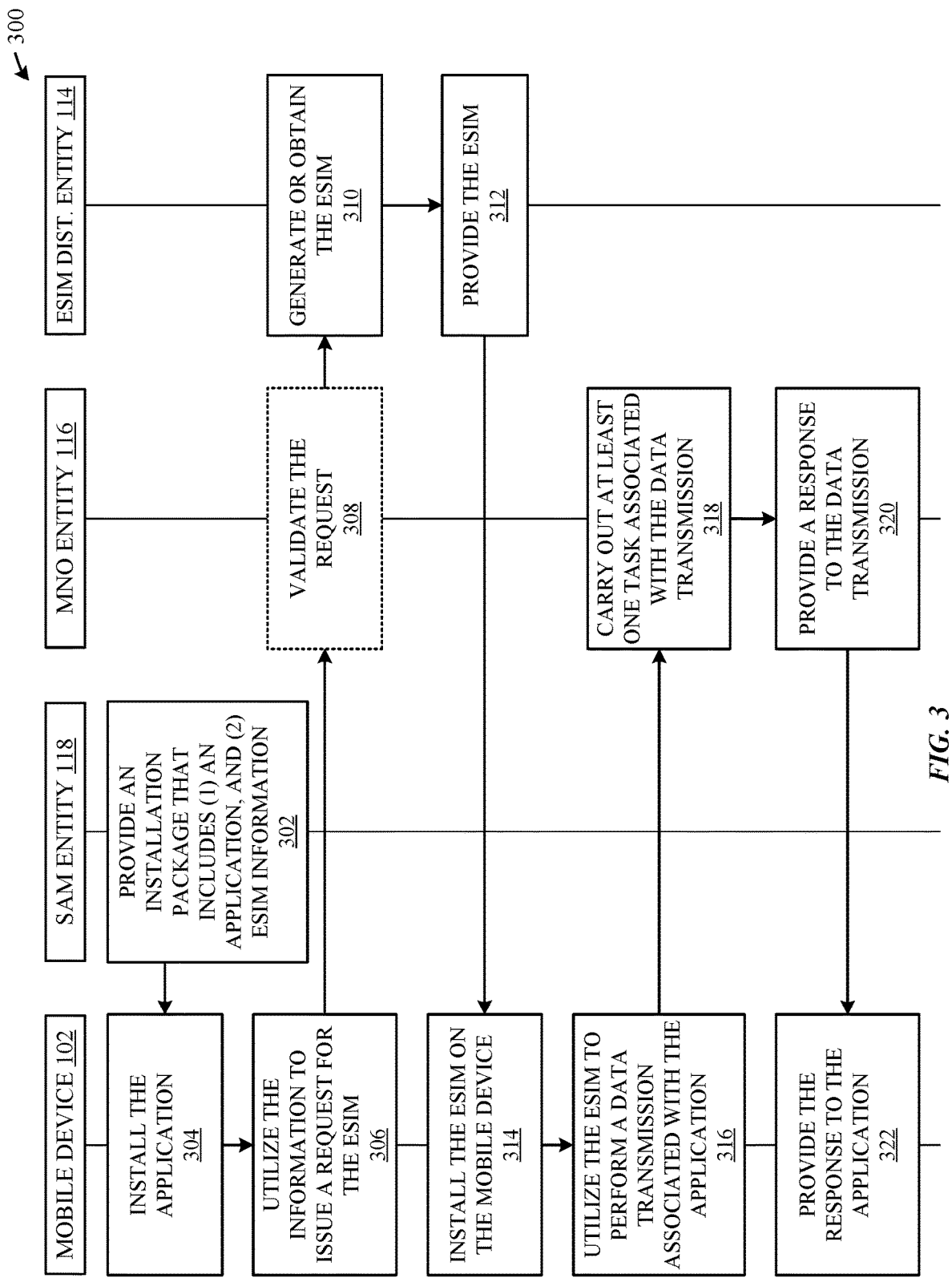
FIG. 3 illustrates a sequence diagram of a method for provisioning a software application and a corresponding eSIM to a mobile device, according to some embodiments.

FIG. 3 illustrates a sequence diagram of a method 300 for provisioning a software application 204 and a corresponding eSIM 212 to a mobile device 102, according to some embodiments. As shown in FIG. 3, the method 300 begins at step 302, where the software application management entity 118 provides, to a mobile device 102, an installation package that includes (1) a software application 204, and (2) information associated with an eSIM 212. According to some embodiments, the software application management entity 118 can be configured to carry out step 302 in conjunction with different scenarios, examples of which will now be described below in greater detail.

In a first scenario, the software application management entity 118 can receive a request from the mobile device 102 to provide the installation package to the mobile device 102. Such a request can be issued by the mobile device 102 in response to any number of conditions being satisfied. For example, the mobile device 102 can be preloaded with a configuration file that causes the mobile device 102 to issue the request to the software application management entity 118 (e.g., when the mobile device 102 is first powered-on, when the mobile device 102 registers with the software application management entity 118, and so on). In another example, the mobile device 102 can issue the request in response to a command input by a user (e.g., when the user is browsing a software application store), and so on.

In a second scenario, the software application management entity 118 can receive a request to provide the installation package from a user that interfaces with the software application management entity. For example, when the software application management entity 118 represents a mobile device management (MDM) entity, an administrator assigned to the MDM entity can interface with the software application management entity 118 and issue relevant commands to cause the installation package to be provided. For example, the mobile device 102 can be a member of a group of mobile devices 102 that belong to an organization and that are overseen by the administrator. In this regard, the request can be generated in response to the administrator (1) selecting the mobile device 102 (e.g., via a management user interface (UI)), and (2) selecting the software application 204 to be installed on the mobile device 102.

At step 304, the mobile device 102 receives and installs the software application 204. According to some embodiments, the installation package can include the software application 204 itself—e.g., installation files, configuration files, etc.—such that the mobile device 102 can install the software application 204 without needing to interface with any other entities. However, varying approaches can be utilized without departing from the scope of this disclosure. For example, the installation package can include information about the software application 204—e.g., an application identifier (ID), an application uniform resource locator (URL), etc.—that enables the mobile device 102 to interface with one or more other entities to obtain and install the software application 204. For example, the mobile device 102 can utilize any of the foregoing information to access an app store to download the software application 204 referenced in the installation package.

At step 306, the mobile device 102 utilizes the information associated with the eSIM 212 (included in the installation package) to issue a request for the eSIM 212. It is noted that, in some cases, the mobile device 102 may already be in possession of an (existing) eSIM 212 that enables the mobile device 102 to access wireless services similar to those that would be accessible by way of the (new) eSIM 212, thereby rendering steps 306—as well as steps 308-314, described below in greater detail—unnecessary to be carried out by the mobile device 102. For example, another software application 204 previously installed on the mobile device 102 might be associated with an (existing) eSIM 212 that can provide the wireless services desired by the software application 204, in which case the (existing) eSIM 212 was already obtained and installed on the mobile device 102 (e.g., by way of steps 306-314 described herein).

Accordingly, when the mobile device 102 is not in possession of the eSIM 212, the mobile device 102 issues the request for the eSIM 212 at step 306. It is noted that steps 308-314 illustrated in FIG. 3 represent only one of a number of different approaches that can be utilized to achieve the same or similar results, and therefore should not be construed as limiting in any manner. As shown in FIG. 3, the mobile device 102 can utilize the information (associated with the eSIM 212) to issue a request for the eSIM 212. In the approach illustrated in FIG. 3, the request is issued to the MNO entity 116, where, at step 308, the MNO entity 116 validates the request. According to some embodiments, the validation can encompass any techniques that the MNO entity 116 can implement in order to effectively determine whether the eSIM 212 should be provided to the mobile device 102. For example, the MNO entity 116 can be configured to verify information referenced in the request, which can include information about the eSIM 212, the mobile device 102, a user of the mobile device 102, the software application management entity 118 (that provided the installation package to the mobile device 102), billing information, credentials, and so on. When the MNO entity 116 validates the request, the MNO entity 116 can interface with the eSIM distribution entity 114 to cause the eSIM distribution entity 114 to generate or obtain the eSIM 212 at step 310, which is described below in greater detail.

At step 310, the eSIM distribution entity 114 generates or obtains the eSIM 212. According to some embodiments, the eSIM distribution entity 114 can manage a collection of "non-provisioned" (i.e., undelivered) eSIMs 212 from which the eSIM 212 can be obtained, where each of the non-provisioned eSIMs 212 are known a respective MNO entity 116 to which the non-provisioned eSIM 212 corresponds. According to some embodiments, when seeking to obtain the eSIM 212, the eSIM distribution entity 114 can identify one or more aspects associated with the eSIM 212—wireless service requirements (as ultimately dictated by the parameters 218 described above in conjunction with FIG. 2A)—and identify, among the pool of non-provisioned eSIMs 212, a non-provisioned eSIM 212 that can be utilized to satisfy the wireless service requirements desired by the software application 204. It is noted that a non-provisioned eSIM 212 that does not satisfy the wireless service requirements (e.g., under a current configuration) can still be selected by the eSIM distribution entity 114 and updated such that non-provisioned eSIM 212 will be capable of satisfying the wireless service requirements when provisioned to the mobile device 102.

Alternatively, and as noted above, the eSIM distribution entity 114 can be configured to generate the eSIM 212 in accordance with the wireless service requirements. This can involve, for example, the eSIM distribution entity 114 generating the various components (e.g., described above in conjunction with FIG. 2A) of which an eSIM 212 is comprised, and forming an eSIM 212 that includes the components. In turn, the eSIM distribution entity 114 can register the eSIM 212 with the MNO entity 116, thereby enabling the MNO entity 116 to identify and authenticate the eSIM 212 when utilized by the mobile device 102. It is noted that other entities can be configured to generate the eSIM 212 without departing from the scope of this disclosure. For example, the MNO entity 116 can be configured to generate the eSIM 212 and provide the eSIM 212 to the eSIM distribution entity 114. In another example, additional entities can be contracted by one or more of the MNO entity 116 and the eSIM distribution entity 114 to assist or handle the generation of the eSIM 212.

Accordingly, at the conclusion of step 310, the eSIM distribution entity 114 is in possession of an eSIM 212 capable of satisfying the wireless service requirements described above. In turn, step 312 can involve the eSIM distribution entity 114 pushing the eSIM 212 to the mobile device 102. The eSIM distribution entity 114 can facilitate this push, for example, by using information about the mobile device 102 included in the request (and forwarded to the eSIM distribution entity 114 by the MNO entity 116). Alternatively, step 312 can involve the mobile device 102 issuing a request to the eSIM distribution entity 114 for the eSIM 212. For example, in an alternative embodiment, the mobile device 102 can receive information—e.g., from the MNO entity 116 in conjunction with steps 308 and 310—that enables the mobile device 102 to interface with the eSIM distribution entity 114 to obtain the eSIM 212. The information can include, for example, (1) address information (e.g., a URL, an internet protocol (IP) address, etc.) that correlates to one or more servers associated with the eSIM distribution entity 114, and (2) an identifier associated with the eSIM 212. It is noted that other information can be provided that results in different interactions between the mobile device 102 and the eSIM distribution entity 114 without departing from the scope of this disclosure. For example, the information can omit the identifier associated with the eSIM 212, where the mobile device 102 is instead required to provide an identifier that the eSIM distribution entity 114 can link to the eSIM 212—e.g., a user identifier associated with a user of the mobile device 102, a unique identifier associated with the mobile device 102 (e.g., an International Mobile Equipment Identity (IMEI) number), an identifier associated with the software application 204, and so on. Consequently, for the foregoing approach to be implemented properly, steps 306-310 would involve the eSIM distribution entity 114 being informed of the identifier and linking the identifier to the eSIM 212 when obtaining or generating the eSIM 212.

At step 314, the mobile device 102 installs the eSIM 212. According to some embodiments, installing the eSIM 212 can involve providing the eSIM 212 to the eUICC 108. In turn, the eUICC 108 can store the eSIM 212 into a memory—e.g., a memory specific to eUICC 108, the memory 106 of the mobile device 102 (e.g., a protected area of the memory 106 that is accessible only to the eUICC 108), and so on.

As a brief aside, it is noted that various measures can be implemented to enhance the overall security with which the mobile device 102, the software application management entity 118, the MNO entity 116, and the eSIM distribution entity 114 communicate data between one another. The following description provides a scenario in which the eSIM 212 is protected when being transmitted to help thwart malicious parties from inappropriately gaining access to the eSIM 212. It is noted, however, that any of the data transmitted between the mobile device 102, the software application management entity 118, the MNO entity 116, and the eSIM distribution entity 114, can be protected in the same or a similar manner without departing form the scope of this disclosure. For example, the installation package itself—and/or any of the components included therein (e.g., the software application 204, the information associated with the eSIM 212), can be encrypted at any level without departing from the scope of this disclosure.

One example approach involves the eSIM distribution entity 114 supplementing the eSIM 212 with one or more digital signatures that can be verified by the mobile device 102 prior to installing the eSIM 212. Moreover, the eSIM 212 can be encrypted using various techniques, e.g., symmetric key cryptography, asymmetric key cryptography, and the like. For example, the eSIM distribution entity 114 can encrypt the eSIM 212 using a public key that is specific to the mobile device 102 so that only the mobile device 102—which possesses the private key counterpart to the public key—is able to decrypt the eSIM 212. To enable this approach to be utilized, the request transmitted by the mobile device 102 at step 306 can include the public key so that it can be utilized by the eSIM distribution entity 114 when carrying out encryption-related activities that target the eSIM 212. Alternatively, the eSIM distribution entity 116 can be provided with a comprehensive list of public keys associated with mobile devices 102 with which the eSIM distribution entity 116 is expected to communicate, thereby obviating the need to transmit the public key with each request, and increasing security.

Accordingly, prior to installing the eSIM 212 at step 314, the mobile device 102 can be configured to verify at least one digital signature associated with the installation package. According to some embodiments, the eSIM 212 can include various digital signatures for elements residing at different hierarchical levels within the eSIM 212. For example, the eSIM 212 itself can be associated with a digital signature that corresponds to a hash of the eSIM 212, where the digital signature is established by way of a private key possessed by the eSIM distribution entity 114. In this example, the mobile device 102 can access a public key counterpart to the private key (possessed by the eSIM distribution entity 114) to verify the digital signature, with the understanding that the mobile device 102 trusts the public key counterpart. For example, the mobile device 102 can be pre-loaded with the public key counterpart in a protected area of memory, the mobile device 102 can interact with a Certificate Authority (CA) to verify the authenticity/identify of the eSIM distribution entity 114, and so on. In this manner, the mobile device 102 can confirm, at least to a reliable degree, that the eSIM 212 is authentic and has not been compromised.

It is noted that the above examples are exemplary and that any number of digital signatures corresponding to any number of hashes of the installation package/individual elements included in the installation package can be utilized. Moreover, the mobile devices 102, software application management entities 118, the MNO entities 116, and the eSIM distribution entities 114 can be configured to pre-store/pre-trust public keys for verifying digital signatures between one another, work with CAs to verify the digital signatures, and so on.

Returning now to the method 300 in FIG. 3, step 316 can involve the mobile device 102 utilizing the eSIM 212 to perform a data transmission associated with the software application 204. According to some embodiments, step 316 can occur in response to the software application 204 launching on the mobile device 102 and issuing a request to perform the data transmission. In response to the request, the mobile device 102 can identify the eSIM 212 that corresponds to the software application 204, and issue a request to the eUICC 108 to utilize the eSIM 212 when performing the data transmission. According to some embodiments, the eUICC 108 can respond to this request by (1) activating the eSIM 212, and (2) interacting with the baseband 110 in accordance with the eSIM 212 such that the data transmission is carried out within the scope of the parameters 218 associated with the eSIM 212 (e.g., the priority level, the bandwidth level, the data allotment, the security requirements, etc.). At step 318, the MNO entity 116 carries out at least one task associated with the data transmission, e.g., an upload, a download, and the like. Notably, various approaches can be utilized to ensure that the data transmission is carried out in accordance with the parameters 218, which are described below in greater detail.

According to some embodiments, the various approaches can involve the mobile device 102 (itself) implementing enforcements, the mobile device 102 and the MNO entity 116 implementing enforcements, the MNO entity 116 (itself) implementing enforcements, and so on. For example, the mobile device 102 can be tasked (in whole or in part) with limiting the data transmission in accordance with the parameters 218 associated with the eSIM 212. In this manner, scenarios can be avoided in which the mobile device 102 continually (and unknowingly) attempts to perform the data transmission in a manner that violates one or more of the parameters 218. In another example, the mobile device 102 can be tasked with performing the data transmission under normal parameters, and receiving operational update requests from the MNO entity 116—e.g., requests to modify priority levels, bandwidth levels, security requirements, etc.—and modifying the data transmission in accordance with the operational update requests. In yet another example, the MNO entity 116 can be tasked (in whole or in part) with limiting the data transmission in accordance with the parameters 218 associated with the eSIM 212. In this manner, the MNO entity 116 can appropriately respond when violations occur—e.g., when the mobile device 102 is compromised, is operating erroneously, and so on.

Regardless of the approach utilized to implement enforcements, at step 320, the MNO entity 116 provides a response to the data transmission—e.g., a response to a download request, an acknowledgement of a completion of an upload request, and so on. In turn, and at step 322, the mobile device 102 can provide the response to the software application 204, thereby satisfying the data transmission initiated at step 316 by the software application 204.

Accordingly, FIG. 3 provides a detailed breakdown of the manner in which the mobile device 102, the software application management entity 118, the MNO entity 116, and the eSIM distribution entity 114 can be configured to communicate with one another to enable the techniques set forth herein to be implemented. Additional high-level details will now be provided below in conjunction with FIGS. 4-5, which set forth methods that can be implemented from the perspective of a mobile device 102 and a software application management entity 118, respectively.

Figure 4:
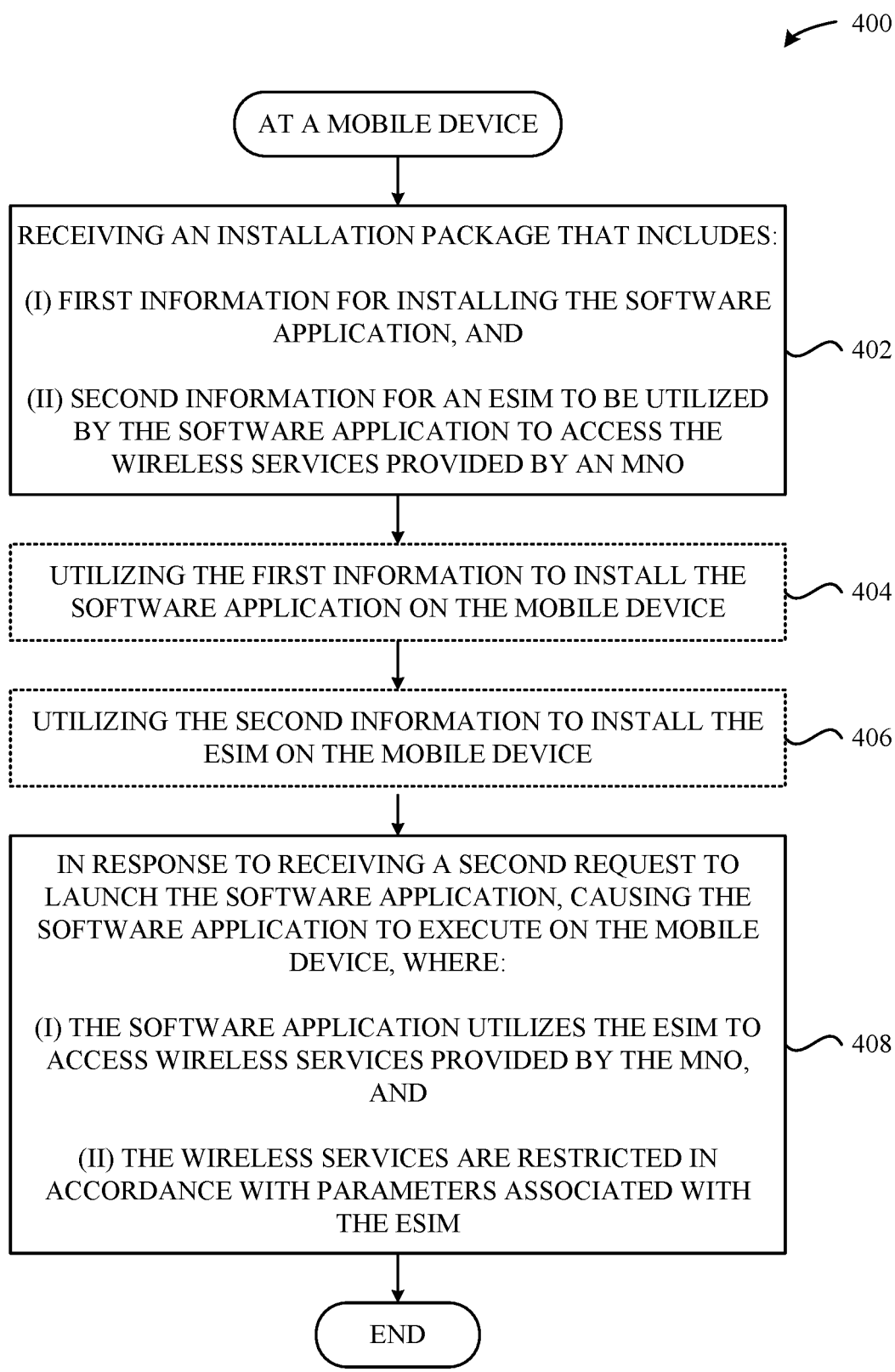
FIG. 4 illustrates a method for enabling a mobile device to install a software application and corresponding eSIM to enable the software application to access wireless services provided by a mobile network operator (MNO) entity, according to some embodiments.

FIG. 4 illustrates a method 400 for enabling a mobile device 102 to install a software application 204 and a corresponding eSIM 212 to enable the software application 204 to access wireless services provided by an MNO entity 116, according to some embodiments. As shown in FIG. 4, the method 400 begins at step 402, where the mobile device 102 receives an installation package that includes: (i) first information for installing the software application 204, and (ii) second information for an eSIM 212 to be utilized by the software application 204 to access the wireless services provided by an MNO entity 116 (e.g., as described above in conjunction with steps 302-304 of FIG. 3).

At step 404, the mobile device 102 utilizes the first information to install the software application 204 on the mobile device 102 (e.g., as described above in conjunction with step 304 of FIG. 3). At step 406, the mobile device 102 utilizes the second information to install the eSIM 212 on the mobile device 102 (e.g., as described above in conjunction with step 314 of FIG. 3). At step 408, the mobile device 102, in response to receiving a second request to launch the software application 204, causes the software application 204 to execute on the mobile device 102, where: (i) the software application 204 utilizes the eSIM 212 to access wireless services provided by the MNO entity 116, and (ii) the wireless services are restricted in accordance with parameters associated with the eSIM 212 (e.g., as described above in conjunction with steps 316-320 of FIG. 3).

Figure 5:
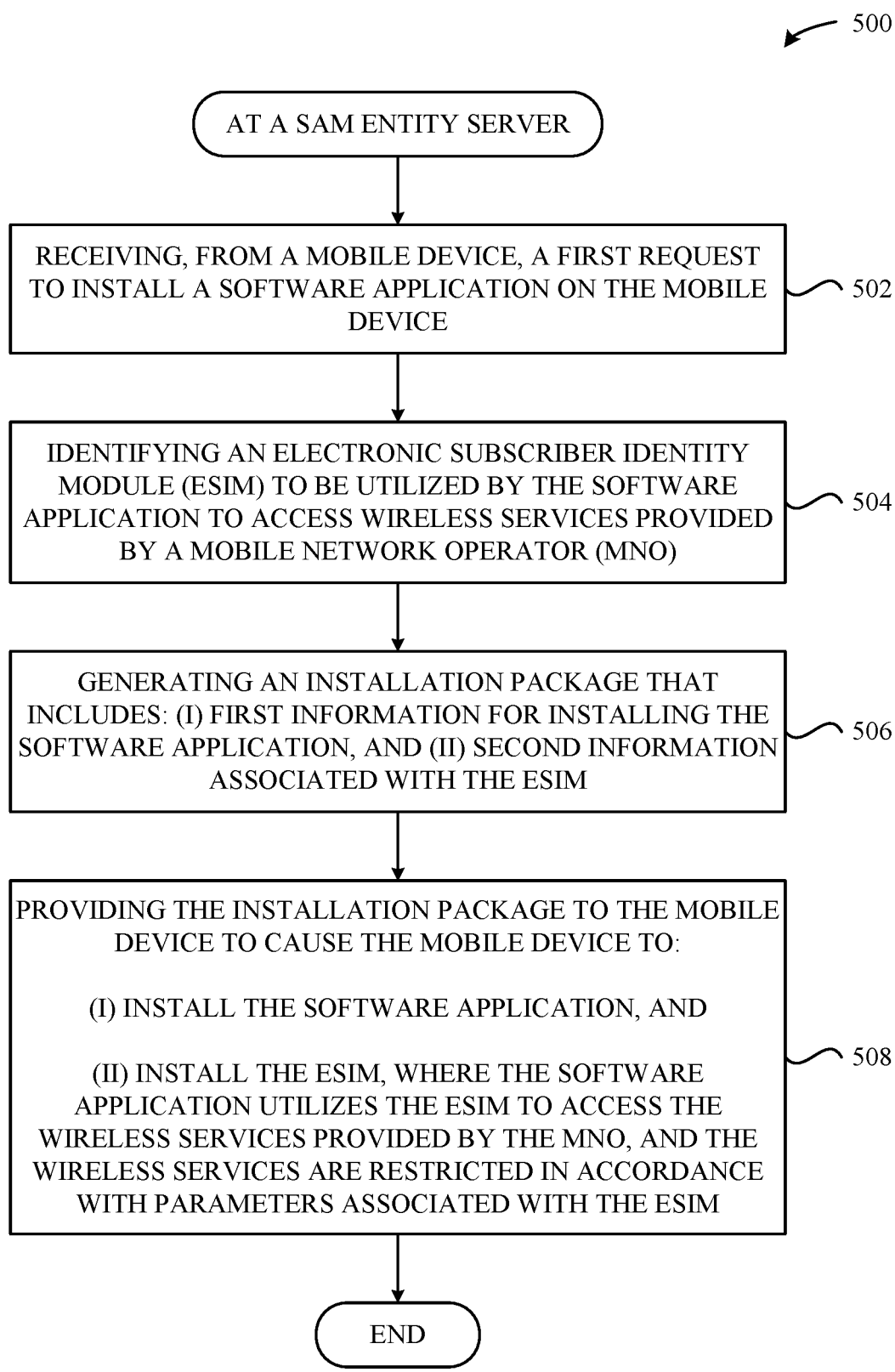
FIG. 5 illustrates a method for a software application management entity to enable a software application on a mobile device to access wireless services provided by an MNO entity, according to some embodiments.

FIG. 5 illustrates a method 500 for a software application management entity 118 to enable a software application 204 on a mobile device 102 to access wireless services provided by an MNO entity 116, according to some embodiments. As shown in FIG. 5, the method 500 begins at step 502, where the software application management entity 118 receives, from the mobile device 102, a first request to install the software application 204 on the mobile device 102 (e.g., as described above in conjunction with step 302 of FIG. 3). At step 504, the software application management entity 118 identifies an eSIM 212 to be utilized by the software application 204 to access wireless services provided by an MNO entity 116 (e.g., as also described above in conjunction with step 302 of FIG. 3). At step 506, the software application management entity 118 generates an installation package that includes: (i) first information for installing the software application 204, and (ii) second information associated with the eSIM 212 (e.g., as further described above in conjunction with step 302 of FIG. 3).

At step 508, the software application management entity 118 provides the installation package to the mobile device 102 to cause the mobile device 102 to: (i) install the software application 204, and (ii) install the eSIM 212, where the software application 204 utilizes the eSIM 212 to access the wireless services provided by the MNO entity 116, and the wireless services are restricted in accordance with parameters 218 associated with the eSIM 212 (e.g., as described above in conjunction with steps 302-322 of FIG. 3).

Figure 6:
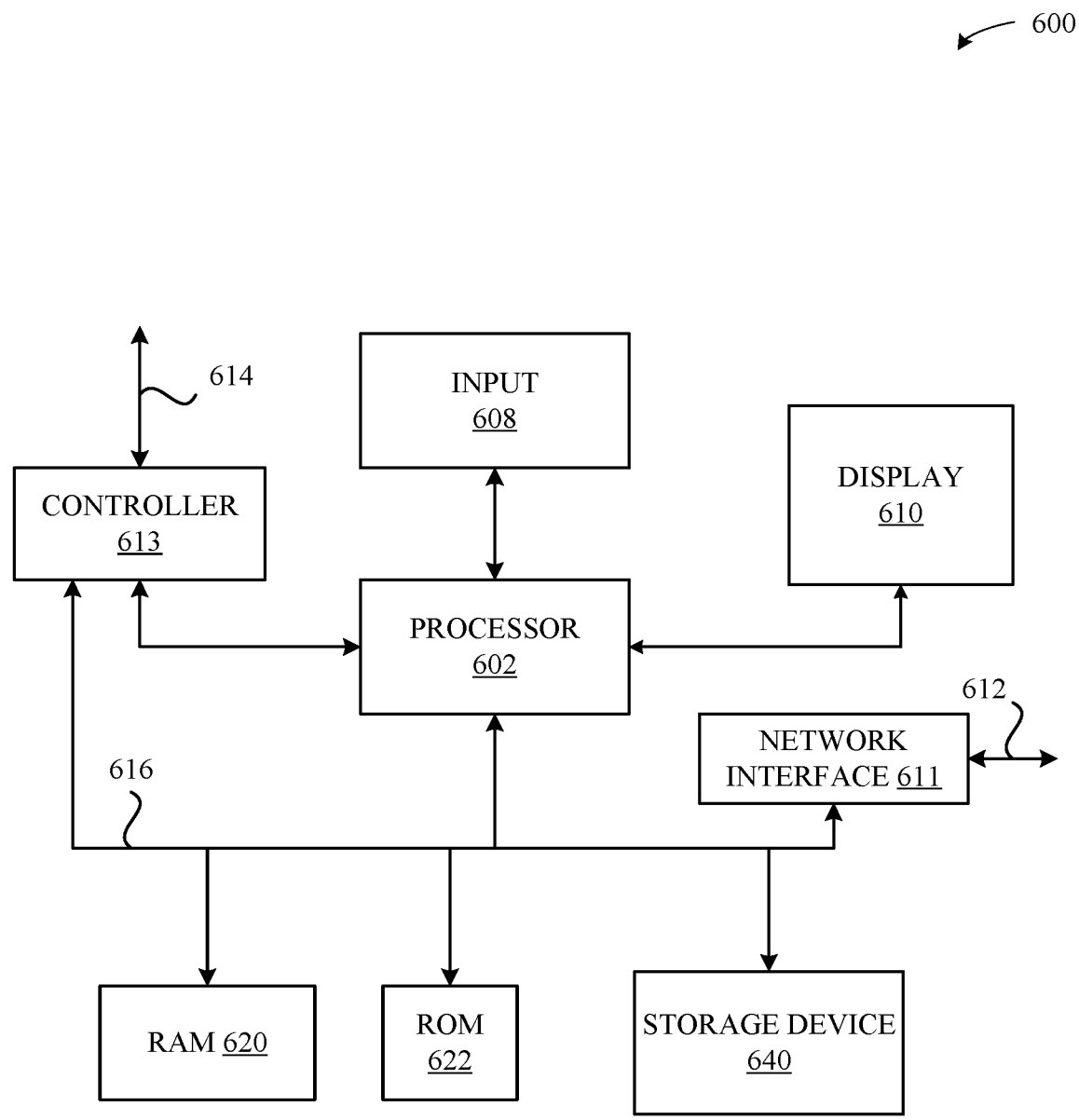
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the server computing devices 102 and the user computing devices 126 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., SSDs), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 102.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as those used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a software application executing on a mobile device to access wireless services provided by a mobile network operator (MNO), the method comprising, at the mobile device:
   receiving, from a software application management entity, an installation package that includes:
      (i) first information for accessing the software application, and
      (ii) second information for accessing an electronic Subscriber Identity Module (eSIM) that is associated with and utilized by the software application to access the wireless services provided by the MNO;
   utilizing the first information of the installation package to install the software application on the mobile device, wherein the software application includes a connectivity profile that corresponds to the eSIM;
   utilizing the second information of the installation package to install the eSIM on the mobile device; and
   in response to receiving a request to launch the software application on the mobile device, causing the software application to execute on the mobile device, wherein:
      (i) the software application utilizes the eSIM by way of the connectivity profile to access the wireless services provided by the MNO, and
      (ii) the wireless services provided by the MNO are restricted in accordance with parameters associated with the eSIM.

2. The method of claim 1, wherein the first information of the installation package comprises:
   the software application itself, or
   instructions for obtaining the software application from a provider.

3. The method of claim 2, wherein the provider comprises:
   at least one server associated with the software application management entity, or
   at least one server associated with a software application store (app store) managed by a manufacturer of the mobile device.

4. The method of claim 2, further comprising, in response to determining that the eSIM is not installed within the mobile device:
   obtaining the eSIM, and
   causing the eSIM to be installed within the mobile device.

5. The method of claim 4, wherein the eSIM is obtained from:
   at least one eSIM server associated with the MNO, or
   at least one eSIM server associated with a manufacturer of the mobile device.

6. The method of claim 5, wherein causing the eSIM to be installed within the mobile device comprises:

providing the eSIM to an electronic Universal Integrated Circuit Card (eUICC) accessible to the mobile device, wherein the eUICC operates the eSIM as a virtualization of a physical SIM card.

7. The method of claim 1, wherein the parameters associated with the eSIM define at least one of:
   a priority level associated with the wireless services provided by the MNO,
   a bandwidth level associated with the wireless services provided by the MNO,
   a data allotment associated with the wireless services provided by the MNO,
   security requirements associated with the wireless services provided by the MNO,
   roaming privileges associated with the wireless services provided by the MNO, or
   temporal aspects associated with the wireless services provided by the MNO.

8. The method of claim 7, wherein the security requirements associated with the wireless services provided by the MNO indicate encryption requirements to be enforced with at least one category of communication links utilized by the software application.

9. At least one non-transitory computer readable storage medium configured to store instructions that, when executed by at least one processor included in a server device managed by a software application management entity, cause the server device to execute steps that include:
   receiving, from a mobile device, a request to install a software application on the mobile device;
   identifying an electronic Subscriber Identity Module (eSIM) that is associated with and utilized by the software application to access wireless services provided by a mobile network operator (MNO);
   generating an installation package that includes:
      (i) first information for accessing the software application, wherein the software application includes a connectivity profile that corresponds to the eSIM, and
      (ii) second information for accessing the eSIM; and
   providing the installation package to the mobile device to cause the mobile device to:
      (i) install the software application utilizing the first information of the installation package, and
      (ii) install the eSIM utilizing the second information of the installation package, wherein:
         the software application, when executing on the mobile device, utilizes the eSIM by way of the connectivity profile to access the wireless services provided by the MNO, and
         the wireless services provided by the MNO are restricted in accordance with parameters associated with the eSIM.

10. The at least one non-transitory computer readable storage medium of claim 9, wherein the first information of the installation package comprises:
    the software application itself, or
    instructions for obtaining the software application from a provider.

11. The at least one non-transitory computer readable storage medium of claim 10, wherein the provider comprises:
    at least one server associated with the software application management entity, or
    at least one server associated with a software application store (app store) managed by a manufacturer of the mobile device.

12. The at least one non-transitory computer readable storage medium of claim 9, wherein the mobile device obtains the eSIM from:
    at least one eSIM server associated with the MNO, or
    at least one eSIM server associated with a manufacturer of the mobile device.

13. The at least one non-transitory computer readable storage medium of claim 12, wherein causing the mobile device to install the eSIM comprises:
    providing the eSIM to an electronic Universal Integrated Circuit Card (eUICC) accessible to the mobile device, wherein the eUICC operates the eSIM as a virtualization of a physical SIM card.

14. The at least one non-transitory computer readable storage medium of claim 9, wherein the parameters associated with the eSIM define at least one of:
    a priority level associated with the wireless services provided by the MNO,
    a bandwidth level associated with the wireless services provided by the MNO,
    a data allotment associated with the wireless services provided by the MNO,
    security requirements associated with the wireless services provided by the MNO,
    roaming privileges associated with the wireless services provided by the MNO, or
    temporal aspects associated with the wireless services provided by the MNO.

15. The at least one non-transitory computer readable storage medium of claim 14, wherein the security requirements associated with the wireless services provided by the MNO indicate encryption requirements to be enforced with at least one category of communication links utilized by the software application.

16. A mobile device configured to enable a software application executing on the mobile device to access wireless services provided by a mobile network operator (MNO), the mobile device comprising:
    at least one processor; and
    at least one memory storing instructions that, when executed by the at least one processor, cause the mobile device to:
       receive, from a software application management entity, an installation package that includes:
          (i) first information for accessing the software application, and
          (ii) second information for accessing an electronic Subscriber Identity Module (eSIM) that is associated with and utilized by the software application to access the wireless services provided by the MNO;
       utilize the first information of the installation package to install the software application on the mobile device, wherein the software application includes a connectivity profile that corresponds to the eSIM;
       utilize the second information of the installation package to install the eSIM on the mobile device; and
       in response to receiving a request to launch the software application on the mobile device, cause the software application to execute on the mobile device, wherein:
          (i) the software application utilizes the eSIM by way of the connectivity profile to access the wireless services provided by the MNO, and
          (ii) the wireless services provided by the MNO are restricted in accordance with parameters associated with the eSIM.

17. The mobile device of claim 16, wherein the first information of the installation package comprises:
   the software application itself, or
   instructions for obtaining the software application from a provider.

18. The mobile device of claim 17, wherein the at least one processor further causes the mobile device to, in response to determining that the eSIM is not installed within the mobile device:
   obtain the eSIM, and
   cause the eSIM to be installed within the mobile device.

19. The mobile device of claim 18, wherein the eSIM is obtained from:
   at least one eSIM server associated with the MNO, or
   at least one eSIM server associated with a manufacturer of the mobile device.

20. The mobile device of claim 19, wherein causing the eSIM to be installed within the mobile device comprises:
   providing the eSIM to an electronic Universal Integrated Circuit Card (eUICC) accessible to the mobile device, wherein the eUICC operates the eSIM as a virtualization of a physical SIM card.

* * * * *